United States Patent [19]
Crozel

[11] Patent Number: 5,676,736
[45] Date of Patent: Oct. 14, 1997

[54] PROCESS FOR INTRODUCING A FILLING GAS INTO AN ENCLOSURE AND INSTALLATION FOR EMPLOYING SAME

[75] Inventor: Didier Crozel, Paris, France

[73] Assignee: L'Air Liquide, Societe Anonyme pour l'Etude et l'Exploitation des Procedes Georges Claude, Paris, France

[21] Appl. No.: 604,017

[22] Filed: Feb. 20, 1996

[30] Foreign Application Priority Data

Feb. 17, 1995 [FR] France .................. 95 01837

[51] Int. Cl.$^6$ .................. B01D 53/047; B01D 53/22
[52] U.S. Cl. .................. 95/45; 95/51; 95/53; 95/55; 95/96; 95/116; 95/230; 96/4; 96/108; 96/133
[58] Field of Search .................. 95/45, 47–56, 95/90, 96, 116, 149, 230; 96/4, 7–13, 108, 130, 133; 426/418, 419

[56] References Cited

U.S. PATENT DOCUMENTS

| | | | |
|---|---|---|---|
| 3,324,626 | 6/1967 | Dresser et al. | 95/53 X |
| 4,675,030 | 6/1987 | Czarnecki et al. | 95/53 X |
| 4,772,295 | 9/1988 | Kato et al. | 95/50 |
| 4,783,203 | 11/1988 | Doshi | 95/50 |
| 4,787,919 | 11/1988 | Campbell et al. | 95/52 X |
| 5,120,329 | 6/1992 | Sauer et al. | 95/51 X |
| 5,156,009 | 10/1992 | Woodruff | 95/54 X |
| 5,158,625 | 10/1992 | Lhote et al. | 95/53 X |
| 5,249,428 | 10/1993 | Barbe et al. | 95/45 X |
| 5,308,382 | 5/1994 | Prasad | 95/52 X |
| 5,332,547 | 7/1994 | Olson et al. | 426/419 X |
| 5,342,637 | 8/1994 | Kusters et al. | 426/419 X |
| 5,344,480 | 9/1994 | Schulte et al. | 95/52 |
| 5,354,547 | 10/1994 | Rao et al. | 95/45 X |
| 5,355,781 | 10/1994 | Liston et al. | 426/419 X |
| 5,429,662 | 7/1995 | Fillet | 95/45 X |
| 5,438,841 | 8/1995 | Cahill-O'Brien et al. | 426/418 X |
| 5,451,248 | 9/1995 | Sadkowski et al. | 426/419 X |
| 5,457,963 | 10/1995 | Cahill-O'Brien et al. | 426/419 X |
| 5,481,852 | 1/1996 | Mitchell | 426/418 X |

FOREIGN PATENT DOCUMENTS

| | | |
|---|---|---|
| 451050 | 10/1991 | European Pat. Off. . |
| 498787 | 8/1992 | European Pat. Off. . |
| 615044 | 9/1994 | European Pat. Off. . |

*Primary Examiner*—Robert Spitzer
*Attorney, Agent, or Firm*—Burns, Doane, Swecker & Mathis, LLP

[57] ABSTRACT

The process for introducing a filling gas into an enclosure initially containing a holding gas includes a step of introducing the filling gas into the enclosure as well as a step of extracting a specific gas initially contained in the filling gas or the holding gas from a mixture collected at the outlet of the enclosure, and possibly a step of recycling this extracted specific gas. Before the step of introducing the filling gas, the enclosure is purged using a purging gas which differs from the fill and holding gases.

19 Claims, 1 Drawing Sheet

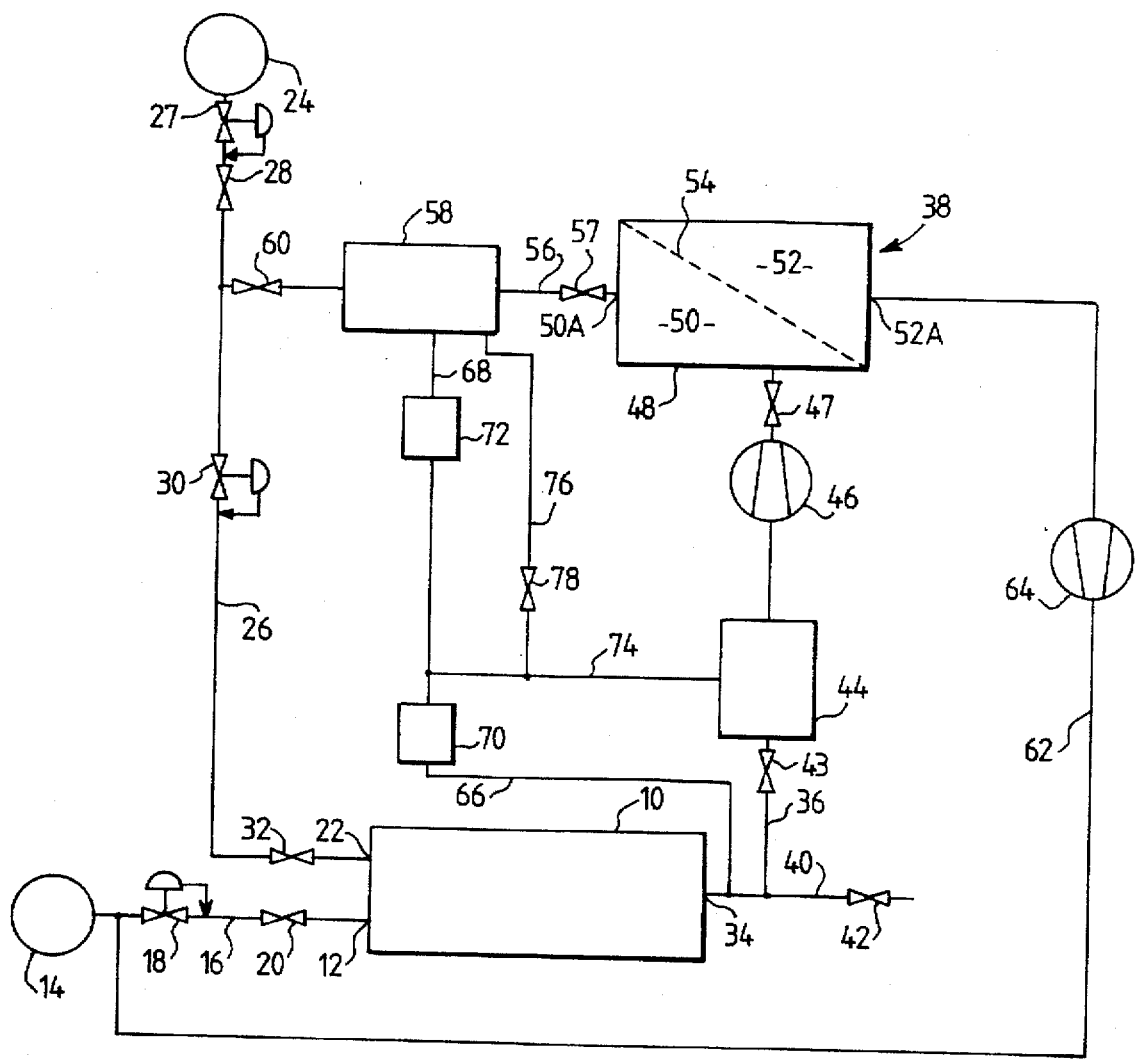

PROCESS FOR INTRODUCING A FILLING GAS INTO AN ENCLOSURE AND INSTALLATION FOR EMPLOYING SAME

BACKGROUND OF THE INVENTION (i) Field of the Invention

The present invention relates to a process for introducing a filling gas into an enclosure initially containing a holding gas, this process including a step of introducing the filling gas into the enclosure as well as a step of extracting a specific gas initially contained in the filling gas or the holding gas from a mixture collected at the outlet of the enclosure, and possibly a step of recycling this extracted specific gas. The invention also relates to an installation for employing this process.

(ii) Description of Related Art

Numerous industrial processes employ one or more specific gases inside a confinement enclosure, and include a step of introducing and totally or partially filling the enclosure with a filling gas consisting partly or totally of the specific gas or gases.

Before introducing the filling gas, the enclosure contains a gas of a different kind, ambient air for example.

Thus, in the course of introducing the filling gas into the enclosure it mixes with the gas present beforehand. It may be beneficial to recover the specific gas emitted or discharged at the outlet of the said enclosure, especially with a view to its recycling within the same application.

Indeed, the specific gases may entail high production cost or even constitute polluting agents which it is undesirable to emit directly into the atmosphere.

Thus, certain processes for employing a specific gas include a step of extracting this specific gas from the mixture collected at the outlet of the enclosure. However, since the specific gas is mixed with other gases of arbitrary kind which are already present in said enclosure before introducing the filling gas, extraction thereof is often difficult or even impossible to achieve under satisfactory economic conditions.

Thus, even in the case of specific gases entailing high production cost, the cost of extracting them from the mixture obtained at the outlet of the enclosure is often greater than the cost of production of the specific gas, thus rendering the employing of such extraction processes unprofitable.

Consequently, in numerous applications, it is not possible to envisage employing certain specific gases which entail a high production cost and/or are very toxic, owing to the impossibility of extracting and recycling, at a reasonable cost, the specific gas used from the mixture emitted from the enclosure when employing the process.

Similar problems are observed when it is desired to empty the enclosure of the specific gas which it contains while introducing another gas such as air into it, while at the same time extracting the specific gas from the mixture thus obtained at the outlet of the enclosure.

SUMMARY AND OBJECTS OF THE INVENTION

The purpose of the invention is to provide a process for introducing a filling gas into an enclosure, allowing easy extraction of the specific gas from the mixture emitted at the outlet of the enclosure, and which is simple and reliable and is of limited cost to employ.

To this end, the subject of the invention is a process for introducing a filling gas into an enclosure initially containing a holding gas, this process including a step of introducing the filling gas into the enclosure as well as a step of extracting a specific gas initially contained in the filling gas or the holding gas from a mixture collected at the outlet of the enclosure, and possibly a step of recycling this extracted specific gas, wherein before the step of introducing the filling gas, the enclosure is purged by means of a purging gas which differs from the fill and holding gases.

According to particular modes of employment, the process can include one or more of the following characteristics:

- the purging gas is chosen such that said specific gas is more easily extractable from the mixture which it forms with the purging gas than from the mixture which would have been formed by the holding and filling gases were said purging gas not used;
- said ease of extraction relating to a specified type of extraction process;
- said mixture is collected during the step of introducing the filling gas, said extracted specific gas being contained initially in the filling gas;
- the process furthermore includes, after the step of introducing the filling gas, a succession of alternate steps of purging the enclosure with the purging gas and of steps of introducing the filling gas into the enclosure, as well as steps of extracting the specific gas from the mixture collected at the outlet of the enclosure at least during each of said purge steps;
- said mixture is collected at least during the step of purging the enclosure, said specific gas initially being contained in the holding gas;
- the introduction of the filling gas is continued until said enclosure is almost totally filled with the filling gas;
- the purging gas is extracted from the mixtures collected at the outlet of the enclosure and is possibly recycled;
- the purging gas is recovered and possibly recycled during extraction of the specific gas;
- the extraction step is a step of selective distillation or of separation by simple cooling and the purging gas and the specific gas have boiling points which are further apart than the specific gas and the mixture which would have been formed by the holding gas and the filling gas;
- the extraction step is a step of selective adsorption, by means of an adsorbent having a selectivity in relation to the two gases which is greater than that which it exhibits in relation to the specific gas and to the mixture which would have been formed by the holding gas and the filling gas;
- the extraction step is a selective permeation which employs a permeation membrane having a selectivity in relation to the two gases which is greater than that which it exhibits in relation to the specific gas and to the mixture which would have been formed by the holding gas and the filling gas;
- the extraction step is a step of selective absorption, by means of an absorbent having a selectivity in relation to the two gases which is greater than that which it exhibits in relation to the specific gas and to the mixture which would have been formed by the holding gas and the filling gas;
- the specific gas contains argon, or neon, or krypton, or xenon, or sulfur hexafluoride, and the purge gas contains argon, or carbon dioxide, or helium, or hydrogen;

the process is applied to the filling of the gap between multiple glazings with said specific gas.

The invention moreover relates to a process of employing a specific gas in an enclosure initially containing a holding gas, this process including a step of introducing a filling gas containing the specific gas into the enclosure, wherein before the step of introducing the filling gas, the enclosure is purged by means of a purging gas which differs from the fill and holding gases, wherein there is provided a step of extracting the specific gas from the mixture collected at the outlet of the enclosure during the step of introducing the filling gas, wherein after the step of introducing the filling gas, the enclosure is again purged by means of a purging gas which differs from the fill and holding gases, before again introducing holding gas into the enclosure, and wherein there is provided a step of extracting the specific gas from the mixture collected at the outlet of the enclosure during this last purging of the enclosure.

The process can furthermore include, after the step of introducing the filling gas, a succession of alternate steps of purging the enclosure with the purging gas and of steps of introducing the filling gas into the enclosure, as well as steps of extracting the specific gas from the mixture collected at the outlet of the enclosure at least during each of said purge steps.

The subject of the invention is also an installation for employing the process as defined above, wherein it includes an enclosure for employing a filling gas including an inlet connected to a filling gas feed pipe and an inlet connected to a purging gas feed pipe, as well as a discharge outlet connected to a device for extracting the specific gas, this extraction device being furnished with a discharge outlet for the extracted specific gas.

According to the invention, the installation can exhibit one or more of the following characteristics:

the discharge outlet for the extracted specific gas is connected to the filling gas feed pipe;

the extraction device is a device for separating the purging gas and the specific gas, and it furthermore includes an outlet for discharging the separated purging gas, connected to the purging gas feed pipe.

BRIEF DESCRIPTION OF THE DRAWINGS

The invention will be better understood on reading the description which follows, given merely by way of example and made while referring to the single figure. The figure is a diagram of an installation adapted for employing a process for introducing a filling gas according to the invention.

DETAILED DESCRIPTION OF PREFERRED EMBODIMENTS

The installation represented in the drawing includes an enclosure 10, here assumed to be a confinement enclosure in which are placed multiple glazings with a view to filling the chambers delimited between the panes of each glazing with a gas exhibiting for example properties of thermal insulation and/or acoustic insulation, krypton for example.

The enclosure 10 includes a first inlet 12 connected to a pressurized purging gas tank 14 by a purging gas feed pipe 16. The purging gas is here assumed to be carbon dioxide, used in particular for its low production cost. The feed pipe 16 includes, in succession starting from the purging gas tank 14 up to the inlet 12, a pressure regulator 18 and a manual inlet valve 20.

The enclosure 10 also includes a second inlet 22 for filling gas, connected to a filling gas tank 24 containing the pressurized specific gas via a filling gas feed pipe 26. The specific gas is here assumed to be krypton whose production cost is high. This feed pipe 26 includes, starting from the filling gas tank 24 up to the inlet 22, a pressure regulator 27, a pilot-operated shut-off valve 28, a pressure regulator 30 and a manual inlet valve 32.

The enclosure 10 furthermore includes a discharge outlet 34 connected by a discharge pipe 36 to a gas separation device 38 adapted to employ selective permeation. A bypass 40 forming a drainage pipe, furnished with a pilot-operated drainage valve 42 at its end open to the ambient medium, is branched off from the discharge pipe 36. The pipe 36 includes, between this branch-off and the device 38, a pilot-operated isolating valve 43, a buffer tank 44, a compressor 46 followed by a pilot-operated valve 47.

The gas separation device 38 includes an enclosure 48, divided into two chambers 50, 52 separated by a selective permeation membrane 54. The latter is adapted so as to separate the specific gas from a mixture containing filling gas and purging gas. In the present case, the membrane 54, of polyimide type, is substantially permeable to carbon dioxide and scarcely impermeable to krypton. Carbon dioxide has been chosen in regard to this membrane and to the use of krypton to allow extraction thereof from the mixture which it forms with the krypton considerably more easily than if the krypton were mixed with air. Indeed, this type of membrane exhibits very good permeability to carbon dioxide, considerably greater than its permeability to air.

An inlet of the chamber 50 is connected to the discharge pipe 36, whilst the reject discharge outlet 50A from this chamber is connected by a recycling pipe 56 to the filling gas feed pipe 26, between the shut-off valve 28 and the latter's regulator 30. The recycling pipe 56 includes, starting from the gas separation device 38, a pilot-operated valve 57, a buffer tank 58 and a pilot-operated shut-off valve 60.

The chamber 52 of the gas separation device 38 is furnished with a permeant discharge outlet 52A for the purging gas to be recycled, connected to the purging gas feed pipe 16, upstream of the pressure regulator 18, by a recycled purging gas recycling pipe 62 furnished with a compressor 64.

The discharge pipe 36 in the vicinity of the discharge outlet 34 and the buffer tank 58 each include a branch-off or bypass, denoted 66 and 68 respectively, connected to the inlet of a chamber forming a continuous gas analyzer, denoted 70 and 72 respectively. The discharge outlets of the gas analyzers are connected by a common analyzed-gases discharge pipe 74 to the buffer tank 44.

A bypass line 76 furnished with a pilot-operated valve 78 connects the buffer tank 58 to the analyzed-gases discharge pipe 74.

The measurement outlets of the gas analyzers 70, 72 are connected to a control system, not represented, allowing pilot-operation of the abovementioned pilot-operated valves.

Each of the devices requiring an energy source, such as the compressors 46 and 64, the pilot-operated shut-off valves, the analyzers 70 and 72 as well as the control system, are connected to appropriate sources of supply, not represented.

When using the installation by employing the process according to the invention, after introducing the multiple glazings into the enclosure 10 and closing the latter, the enclosure contains ambient air forming a holding gas. With all the installation's valves represented in FIG. 1 being closed with the exception of the inlet valve 20 and the drainage valve 42, the compressors 46 and 64 being shut-off, purging gas flows from the purge tank 14 to the drainage valve 42 under the effect of the overpressure prevailing in the tank 14, thus causing the scavenging of the enclosure 10. After a specified period of time, the enclosure 10 contains essentially purging gas, the ambient air having been discharged together with some of the purging gas into the atmosphere from the open drainage valve 42.

After completing this initial purge step by filling the enclosure 10 with low production cost and non-polluting purging gas, the valve 20 is closed and the valve 32 is opened so as to proceed with the step of filling the enclosure 10 with the specific gas.

In the course of the purge and fill steps described above, the analyzer 70 detects the specific gas content at the outlet of the enclosure 10. At the start, the valve 43 is closed and the valve 42 is opened, this having the effect of venting the gas leaving the enclosure 10. When the analyzer 70 detects the presence of specific gas in the mixture leaving the enclosure 10, the control system opens the valve 43 and simultaneously closes the valve 42 so as to convey the gas to the extraction device 38.

At the end of the step of filling the enclosure 10 with the specific gas, which may in particular be prolonged until the analyzer 70 detects a specific gas content Y34 in the pipe 34 which is greater than a reference content $Y34_{ref}$, the valves 32 and 43 are closed and the filled glazings may be sealed.

In the case where the enclosure still contains an appreciable quantity of specific gas in the dead volumes outside the glazings, a step of final purging by means of purging gas is conducted by opening the valves 20 and 43. The valves 32 and 42 are kept closed, so as to convey all of the mixture discharged from the enclosure 10 to the extraction device 38, until in essence the specific gas contained in the enclosure 10 has been driven out by the entering purging gas to the extraction device 38.

At the end of the sequence of steps described above, the enclosure 10 can be opened to ambient air in order to proceed with the replacement of the glazings which it contains with other glazings ready to be filled.

Thus, in this last step, there is replacement of the specific gas forming a holding gas with air forming a filling gas, by employing an intermediate step consisting in purging with purging gas.

The introduction and discharge of the gases during the initial purging, filling and final purging steps described above are performed according to known processes. These processes may in particular seek either the realization of sizeable convective motions, or on the contrary the creation of a plug flow inside the enclosure so as to ensure complete scavenging of the whole enclosure by the gas introduced. These processes may also draw advantage from the differences in density between the holding, fill and purging gases so as to improve the quality of the plug flows. In this case, the introduction or the removal of the different gases are performed through various orifices situated preferably at a low point for the relatively heavy gases, and at a high point for the relatively light gases.

The valve operating device associated with an automatic control system furthermore pilots the operations described below. This system receives information transmitted to it by the analyzers 70 and 72, and indications regarding the quantities of gas contained in the tanks 58 and 44, these indications being transmissible by pressure sensors or level indicators in the case of variable-volume storage tanks.

When the tank 44 is full, this corresponding to the detection of a high-level indication in the case for example of a constant-pressure volumetric tank, the control system triggers the extraction step, turning on the compressors 46 and 64 and opening the valves 47 and 57.

The gas mixture contained in the reservoir 44 enters the chamber 50, and, under the effect of the pressure resulting from the compressor 46, a sizeable part of the purging gas and a small part of the specific gas pass through the membrane 54 to the chamber 52, whilst the major part, thus separated, of the specific gas and the remainder of the purging gas are discharged by the recycling pipe 56 to the buffer tank 58. In parallel with this, under the effect of the compressor 64, the gas issuing from the chamber 52, essentially consisting of purging gas, is conveyed by the recycling pipe 62 to the purging gas feed pipe 16.

The control system performs a test to check two conditions simultaneously:

(i) is the specific gas content in the gas contained in the buffer tank 58 greater than the specific gas reference content $Y58_{ref}$, the latter being greater than the content $Y10_{ref}$ and corresponding to a minimum purity imposed for the specific gas present in the buffer tank 58? and (ii) is the pressure of the gas in the buffer tank 58 greater than a reference pressure corresponding to the minimum pressure allowing satisfactory use of the gas for the filling of the enclosure 10?

If both the conditions above are complied with, the control system operates the opening of the valve 60 and closes or keeps closed the valve 28, thus allowing the preferential use of the recycled specific gas issuing from the buffer tank 58 for the filling of the enclosure 10.

On the other hand, if one of the two conditions is not complied with, that is to say the purity or the pressure of the specific gas contained in the buffer tank is insufficient, the control system closes or keeps closed the valve 60 and opens the valve 28. Thus, in both cases, the feed pipe 26 for the enclosure 10 is fed with specific gas from the tank 24 or the buffer tank 58.

In the case where the first condition cited above is not complied with, that is to say the specific gas content in the buffer tank 58 is insufficient, the control system opens the valve 78, allowing gradual discharge of the gas contained in the buffer tank 58 to the tank 44 via the path defined by the branch-off 76 and the discharge pipe 74. When the specific gas content in the buffer tank 58 is sufficient or if the pressure in the buffer tank 58 falls to a threshold fixed at a level greater than atmospheric pressure, the control system closes the valve 78.

Under these conditions, the enclosure 10 can be almost totally filled with specific gas if desired, without a sizeable excess quantity of specific gas being extracted from the storage tank 24, and without a sizeable loss of specific gas. Indeed, the specific gas discharged from the enclosure 10 together with the purging gas is essentially recycled and is collected in the buffer tank 58.

In accordance with particular embodiments of the installation, the compressor 64 is replaced with a device, a vacuum pump for example, also enabling the pressure in the chamber 52 to be brought below atmospheric pressure so as to improve the performance of the extraction device 38.

Moreover, downstream of the valve 42 may be arranged a device for extracting purging gas so as to separate the latter from the mixture collected at the outlet of the enclosure during the step of initial purging. This purging gas can be recycled.

Similarly, the recycling pipe 62 can be omitted, and the purging gas leaving the extraction device is thus emitted directly into the atmosphere. Its emission is of only small significance to the cost of operating the installation, since the cost of the purging gas (carbon dioxide) is small compared with that of the specific gas.

Similarly, the gas separation device 38 can be replaced with a device for selective distillation, or a device for separation by simple cooling, or a device for selective adsorption, in particular of the PSA type (Pressure Swing Adsorption) or VSA (Vacuum Swing Adsorption) or again a device for selective absorption. In the latter case, by contrast, the specific gas is extracted from the mixture collected at the outlet of the enclosure 10 and the purging gas is not recovered but is absorbed. In the other cases, the specific gas is extracted by employing a separation process and the purging gas is likewise recovered.

Whatever type of extraction device is used, the purging gas is chosen such that the specific gas is easily extractable from the mixture formed by these two gases. This choice is therefore made in regard to the specific gas to be extracted and to the extraction or separation device used.

Thus for example, if the extraction step is a step of selective distillation or of separation by simple cooling, then the purging gas and the specific gas have boiling points which are further apart than the specific gas and the mixture which would have been formed by the holding gas and the filling gas.

If the extraction step is a step of selective adsorption then the adsorbent has a selectivity in relation to the two gases which is greater than that which it exhibits in relation to the specific gas and to the mixture which would have been formed by the holding gas and filling gas.

If the extraction step is a selective permeation then the permeation membrane has a selectivity in relation to the two gases which is greater than that which it exhibits in relation to the specific gas and to the mixture which would have been formed by the holding gas and the filling gas.

If the extraction step is a step of selective absorption then the absorbent has a selectivity in relation to the two gases which is greater than that which it exhibits in relation to the specific gas and to the mixture which would have been formed by the holding gas and filling gas.

Moreover, the installation described here is used for filling the space between the panes of multiple glazings, these multiple glazings being received in an enclosure 10. It is also possible to envisage connecting the feed pipes 16 and 26 and the discharge pipe 36 directly to each glazing, the enclosure then being delimited by the glazings themselves.

The installation can also serve to fill insulating panels, serving as thermal insulation, with gases of low thermal conductivity.

In the description given above, the filling gas is the specific gas itself, but it is also possible to envisage filling gas consisting of several gases including the specific gas, which are introduced either as a mixture with essentially constant content or successively from several storage tanks 24 with a view to optimizing the step of filling the enclosure. The purging gas is then chosen such that the specific gas is easily extractable as compared with the purging gas and the gas recycled by the pipe 56 can contain a sizeable share of gases which differ from the purging gas.

Moreover, by way of example, the invention can also be employed by means of an installation similar to that described above for the production or packaging of food or pharmaceutical products, the enclosure 10 in this case serving to keep said products under a controlled atmosphere. The enclosure 10 can in particular contain packs for dispensing and marketing said products or itself be a pack of the above type. The specific gas used may in particular be argon or a mixture of rare gases having specific properties in relation to enzymatic reactions, it being possible for the purging gas preferentially to be carbon dioxide, on account of its low production cost.

Similarly, the enclosure can contain bulbs or itself be an electronic or electric light bulb intended to be filled with gas. The enclosure can also be an item of equipment serving in the manufacture of electronic components under controlled atmosphere, or an oven, a heat treatment oven for example.

Moreover, in the case of the filling of multiple glazings for example, it is possible to use a chamber in free communication with the ambient medium in its upper part and whose fill and purging gas inlets and outlet for collecting the mixture contained within are arranged in the lower part thereof thus defining a useful enclosure.

The chamber initially containing ambient air, as well as the multiple glazings to be filled, arranged in the lower part of the chamber, is completely purged with carbon dioxide introduced through the bottom of the chamber. The carbon dioxide, having a density greater than that of air, pushes out the air through the top of the chamber until the latter is totally or partially filled.

Filling gas, for example krypton, is then introduced through the bottom of the chamber. This gas, having a density greater than that of carbon dioxide, remains below the carbon dioxide and drives some of the latter out through the upper opening in the chamber. Filling gas is introduced into the enclosure, and the upper part of the chamber remains thus filled with carbon dioxide. The multiple glazings located in the lower volume of the krypton-filled chamber are then sealed. At this point, the enclosure is full of krypton.

Before taking out the finished glazings from the chamber, part of the gas contained in the latter is removed through the bottom. Thus, at the start of this step, essentially krypton is removed from the chamber. Removal is continued until all the krypton contained in the enclosure formed by the bottom part of the chamber is extracted. The mixture removed, having a high concentration of krypton, is treated so as to extract the krypton therefrom. By virtue of the different densities of the gases, the chamber then contains carbon dioxide in its lower part and air in its upper part. This step of employment thus leads to the purging of the enclosure consisting of the lower volume of the chamber, with the carbon dioxide stored in the upper part of the chamber, with a view to recovering the krypton previously contained in the lower volume of the chamber. The sealed glazings are withdrawn from the chamber through the upper opening therein or through appropriate airlocks and new glazings to be filled are introduced.

In order to proceed with the filling thereof, krypton is again introduced through the bottom of the chamber expelling the carbon dioxide into the upper part of the chamber. The glazings are next sealed and a new step of purging the lower volume of the chamber with the carbon dioxide stored in the upper part is employed before taking out the finished glazings. A succession of alternate steps of purging the chamber with carbon dioxide, introducing krypton for the filling of the lower volume thereof are then carried out so as to proceed with the series filling of new sets of glazings. Steps of extracting the krypton from the mixture obtained at the outlet of the chamber are employed during each step of purging the krypton with carbon dioxide.

It should be noted that the thickness of the carbon dioxide buffer used can be small and in particular less than the height of the useful enclosure in respect of the filling of the glazings. Under these conditions, during the purging phases, the enclosure formed by the lower part of the chamber is not completely filled with carbon dioxide and the top part thereof is filled with ambient air. The process according to the invention nevertheless applies since the gas removed into the lower part of the enclosure is not in contact with the ambient air. The flow into the enclosure of the carbon dioxide buffer creates a purging thereof.

According to a variant of this mode of employment, the carbon dioxide serving for the purging can be stored in an auxiliary tank connected to a discharge outlet arranged in the upper part of the chamber, rather than be stored directly in the upper half of the chamber. With a view to the filling of multiple glazings, the chamber is then totally filled with krypton and in this case it constitutes the useful enclosure.

Similarly, the invention is applicable to the recycling of argon in processes for rabbling steel with argon (or with a mixture of argon and nitrogen), the enclosure consisting of the converter or the ladle surmounted by a gas recovery hood, and the purging gas preferentially being carbon dioxide.

The invention can also be employed for the inert blanketing followed by the venting of reactors, tanks or pipes containing chemical products and in particular specific gases resulting from chemical reactions. In the case where it is desirable to recover said products on account of their costs or their impacts on the atmosphere, the inert blanketing is carried out by means of a purging gas chosen so as to ease the extraction and recovery of the specific gases from the mixture which they form with the purging gas.

The installation described in connection with the appended drawing uses krypton as specific gas and carbon dioxide as purging gas, but it is obvious that other specific gases may be used, in particular neon, argon, xenon, sulfur hexafluoride or any other halogen compound and hydrocarbons, and that other purging gases may be used as replacement for carbon dioxide, in particular argon, helium or hydrogen.

The use of helium as purging gas furthermore offers the possibility of readily detecting leaks in the case of employing the specific gas in a multiple glazing, for the quality control of production, by mass spectrometry for example.

It is appreciated moreover that such an installation employing the process according to the invention can be particularly beneficial in the case of processes employing dangerous specific gases whose release into the atmosphere is harmful. Indeed, the specific gas emitted from the enclosure through the discharge outlet 34 is essentially recovered in the buffer tank 58 after treatment, and only a small fraction thereof leaving the extraction device 38 through the outlet 52A is not totally recycled.

It should be noted that the purging gas may have complementary properties in relation to the process for employing the specific gas. In particular, the purging gas may be chosen so as furthermore to improve the sensitivity of the analyses of the specific gas, or to improve the effectiveness of the purging and/or filling operations by virtue of the fact that its molar mass differs from the other gases used, or again to exhibit advantageous properties as regards thermal conductivity, viscosity, molar mass, thermal reactivity, or ease of detection for example.

An advantage of the invention is that it allows an improvement in the productivity of employing the specific gas by virtue of the increase in the fill rate, while also improving the filling performance (final fill ratio and loss of specific gas).

What is claimed is:

1. A process for introducing a filling gas into an enclosure initially including a holding gas comprising the steps of:
   (i) introducing the filling gas into the enclosure;
   (ii) extracting a specific gas initially included in the filling gas or the holding gas from a mixture collected at an outlet of the enclosure;
   (iii) optionally recycling the extracted specific gas; and
   (iv) purging the enclosure with a purging gas which differs from the filling gas and the holding gas before the step of introducing the filling gas into the enclosure.

2. The process as claimed in claim 1, wherein the purging gas of step (iv) is employed such that the specific gas is more easily extractable from the mixture which said specific gas forms with the purging gas than from a mixture formed by the holding gas and the filling gas in the absence of said purging gas.

3. The process as claimed in claim 1, comprising collecting said mixture during the step of introducing the filling gas, said extracted specific gas being included initially in the filling gas.

4. The process as claimed in claim 3 further comprising, after the step of introducing the filling gas, a succession of alternate steps of:
   (i) purging the enclosure with the purging gas and introducing the filling gas into the enclosure; and
   (ii) extracting the specific gas from the mixture collected at the outlet of the enclosure at least during each of said purging steps.

5. The process as claimed in claim 1, comprising collecting a mixture of said holding gas and said purging gas at least during the step of purging the enclosure, said specific gas being included in the holding gas.

6. The process as claimed in claim 1, comprising continuing the step of introducing the filling gas until said enclosure is almost totally filled with the filling gas.

7. The process according to claim 1, comprising extracting the purging gas from the mixture collected at the outlet of the enclosure and optionally recycling said purging gas.

8. The process as claimed in claim 7, comprising recovering the purging gas and optionally recycling said purging gas during extraction of the specific gas.

9. The process as claimed in claim 1, wherein the extraction step comprises a selective distillation or a separation by simple cooling and wherein the purging gas and the specific gas have boiling points which are further apart than the specific gas and a mixture of the holding gas and the filling gas.

10. The process as claimed in claim 1, wherein the extraction step comprises selective adsorption by means of an adsorbent having a selectively in relation to the purging gas and the specific gas which is greater than that which it exhibits in relation to the specific gas and to a mixture of the holding gas and the filling gas.

11. The process as claimed in claim 1, wherein the extraction step comprises a selective permeation which employs a permeation membrane having a selectivity in relation to the purging gas and the specific gas which is greater than that which it exhibits in relation to the specific gas and to a mixture of the holding and the filling gas.

12. The process as claimed in claim 1, wherein the extraction step comprises selective absorption, by means of an absorbent having a selectivity in relation to the purging gas and the specific gas which is greater than that which it exhibits in relation to the specific gas and to a mixture of the holding gas and the filling gas.

13. The process as claimed in claim 1, wherein the specific gas comprises argon, neon, krypton, xenon, or sulfur hexafluoride, and wherein the purging gas comprises argon, carbon dioxide, helium, or hydrogen.

14. The process as claimed in claim 1 further comprising the step of filling a gap between multiple glazings with said specific gas.

15. A process of employing a specific gas in an enclosure initially including a holding gas, said process comprising the steps of:

(i) introducing a filling gas comprising the specific gas into the enclosure;

wherein before the step (i) of introducing the filling gas, the enclosure is purged by means of a purging gas which differs from the filling and holding gases;

(ii) extracting the specific gas from a mixture collected at an outlet of the enclosure during the step (i) of introducing the filling gas;

wherein after the step (i) of introducing the filling gas, the enclosure is again purged by means of a second purging gas which differs from the filling and holding gases, before again introducing a second holding gas into the enclosure; and extracting the specific gas from the mixture collected at the outlet of the enclosure at least during the purging of the enclosure of step (ii).

16. The process as claimed in claim 15 further comprising, after the step of introducing the filling gas, a succession of alternate steps of:

(i) purging the enclosure with the purging gas and introducing the filling gas into the enclosure; and (ii) extracting the specific gas from the mixture collected at the outlet of the enclosure at least during each of said purging steps.

17. An installation for introducing a filling gas into an enclosure initially including a holding gas, comprising:

(i) an enclosure for employing said filling gas, including an inlet connected to a filling gas feedpipe, an inlet connected to a purging gas feed pipe, and a discharge outlet;

(ii) a source of said filling gas;

(iii) a source of said purging gas; and (iv) a device for extracting a specific gas initially included in the filling gas or the holding gas, from a mixture collected at said discharge outlet, said device being connected to said discharge outlet of said enclosure;

wherein said source of purging gas is chosen such that said specific gas is more easily extractable from a mixture formed of said specific gas and said purging gas than from a mixture which would be formed by said holding gas and said filling gas in the absence of said purging gas.

18. The installation as claimed in claim 17 wherein said device further comprises a discharge outlet for the extracted specific gas which is connected to the filling gas feed pipe.

19. The installation as claimed in claim 17, wherein the extraction device is a device for separating the purging gas and the specific gas, and wherein said installation further comprises an outlet for discharging the separated purging gas, connected to the purging gas feedpipe.

* * * * *